(12) United States Patent
Ueda et al.

(10) Patent No.: US 7,209,311 B2
(45) Date of Patent: Apr. 24, 2007

(54) DATA STORAGE DEVICE AND CONTROL METHOD THEREFOR TO PREVENT OFF-TRACK WRITING

(75) Inventors: Tetsuo Ueda, Kanagawa (JP); Isao Yoneda, Kanagawa (JP); Hideki Ohzeki, Kanagawa (JP); Naoyuki Minami, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 123 days.

(21) Appl. No.: 11/063,487

(22) Filed: Feb. 22, 2005

(65) Prior Publication Data

US 2005/0185320 A1    Aug. 25, 2005

(30) Foreign Application Priority Data

Feb. 20, 2004    (JP) .............................. 2004-044322

(51) Int. Cl.
*G11B 5/596* (2006.01)
(52) U.S. Cl. ................................... 360/77.06
(58) Field of Classification Search ............. 360/77.06, 360/75, 60, 78.12, 78.04, 78.06, 78.08, 55
See application file for complete search history.

(56) References Cited

U.S. PATENT DOCUMENTS

| | | | | |
|---|---|---|---|---|
| 4,967,293 A | * | 10/1990 | Aruga et al. .............. 360/78.12 |
| 5,606,468 A | * | 2/1997 | Kodama ....................... 360/75 |
| 5,612,833 A | * | 3/1997 | Yarmchuk et al. ............ 360/75 |
| 5,654,840 A | * | 8/1997 | Patton et al. ................ 360/75 |
| 6,101,062 A | * | 8/2000 | Jen et al. ...................... 360/75 |
| 2003/0035240 A1 | | 2/2003 | Takeuchi et al. | |
| 2004/0075929 A1 | * | 4/2004 | Shimizu et al. ............... 360/60 |

FOREIGN PATENT DOCUMENTS

JP          06-119730          4/1994

\* cited by examiner

*Primary Examiner*—Fred F. Tzeng
(74) *Attorney, Agent, or Firm*—Townsend and Townsend and Crew LLP; Patrick Duncan

(57) ABSTRACT

Embodiments of the invention provide control of a disk data storage device to prevent off-track writing. In one embodiment, the SA acquires the CYLIDs and ADC Values generated from the SERVO SIGNALs acquired previously, and generates DACOUT which defines a driving current of the VCM driver. The SA monitors the DACOUT generated and determines whether the DACOUT is within a predefined range. If the DACOUT is outside the predefined range, data writing is inhibited. By monitoring the DACOUT, it is possible for the VCM driver to detect supply of an overcurrent to the VCM driver 210 beforehand, and off-track writing can thus be prevented.

14 Claims, 5 Drawing Sheets

DATA STORAGE DEVICE AND CONTROL METHOD THEREFOR TO PREVENT OFF-TRACK WRITING

CROSS-REFERENCES TO RELATED APPLICATIONS

This application claims priority from Japanese Patent Application No. JP2004-044322, filed Feb. 20, 2004, the entire disclosure of which is incorporated herein by reference.

BACKGROUND OF THE INVENTION

The present invention relates to data storage devices and control methods for the same, and more particularly, to a data storage device preventing unexpected movement of an access unit which accesses a storage medium, and a method of controlling this storage device.

Devices known as data storage devices use various types of media such as an optical disk or magnetic tape. Among these storage devices is a hard-disk drive (HDD) most commonly used as a storage device in a computer, and the HDD is one of storage devices indispensable in current computer systems. Furthermore, the excellent characteristics of the HDD are increasingly expanding its applications not merely as an element of a computer, but also as a removable memory in a product such as a dynamic-image recording/reproducing device, car navigation system, or digital camera.

The magnetic disk used for the HDD has a plurality of concentrically formed tracks, and address information (servo information) and user data are stored into each of the tracks. Magnetic heads each formed of thin-film elements can write in or read out data by accessing a desired region (address) in accordance with address information. The signals that a magnetic head has read out from the magnetic disk during a data readout process are provided with waveform shaping, decoding, and other required signal processing, by a signal-processing circuit, and then transmitted to a host. After undergoing required processing by the signal-processing circuit similarly to the above, transfer data from the host is written onto the magnetic disk.

The magnetic head is fixed to a slider, and the slider is further fixed to a turnable carriage. The carriage is oscillated by a voice coil motor (VCM) to allow the magnetic head to be moved to a desired position on the magnetic disk. The VCM is driven by a VCM driver, which drives the VCM by supplying a current thereto in response to the control data sent from a controller.

As described above, each track includes a data region into which data is stored, and a servo region into which servo information is stored. A cylinder ID, a servo sector number, a burst pattern, and other data are stored as servo data into the servo region. The cylinder ID, which denotes a track number, and the servo ID, identify track and servo sector addresses, respectively. The burst pattern includes relative position information of the magnetic head with respect to the track. The burst pattern is constructed of a plurality of signal storage region arrays different from one another in terms of the phase of a signal storage region; each region being adapted so that signals are stored thereinto, and being disposed with a fixed spacing in the radial direction of the disk.

Data reading from or writing onto the magnetic disk is accomplished while the position of the corresponding magnetic head is being confirmed by means of servo information under the rotating state of the magnetic disk. Servo information that has been read by the magnetic head undergoes arithmetic processing by the controller. The value of the current to be supplied to the VCM is determined by being calculated from the relationship between the current position of the magnetic head and the intended position thereof. The controller generates the control data DACOUT that indicates the above-calculated electric current value, and supplies the current to the VCM driver. In case of a deviation, the carriage is driven to compensate for the deviation, whereby the position of the magnetic head is controlled.

Movement of the magnetic head, however, may become uncontrollable for reasons such as a servo information error, noise current, servo logic circuit fault, or software bug. In such a case, the magnetic head may enter the so-called "runaway" condition, and if this actually happens, the magnetic head or the slider will collide and suffer damage.

Japanese Patent Laid-open No. 2003-059216 discloses one method for solving the above problem. A speed control value generated on the basis of servo information is converted into an analog signal (voltage signal) by a digital/analog converter (D/A converter) and then further converted into a driving current for the VCM. The VCM is driven by this driving current. The speed control value for setting the moving speed of an actuator, namely, the magnetic head, is generated and output at the required intervals on the basis of the servo information. If the magnetic head is under a runaway state, however, the speed control value is not generated at the required intervals. Accordingly, the generation of the speed control value is monitored and if it is not generated at the required intervals, the magnetic head is regarded as not under a runaway state, and a measure is taken to protect the magnetic head from runaway.

BRIEF SUMMARY OF THE INVENTION

In the conventional approach, runaway of the magnetic head is prevented by monitoring the generation intervals of the speed control value. The speed control value is generated after the magnetic head has moved and read servo information. An error in the generation intervals, therefore, is not detected until the magnetic head has actually started to move at high speed. Since there exists a time lag between the movement of the magnetic head and the detection of such an error, movement control of the magnetic head delays behind actual runaway thereof.

Another problem also occurs. That is, during data writing, if an overcurrent is inadvertently supplied to the VCM, the corresponding magnetic head deviates from a planned track and this deviation causes off-track writing in which data is written onto a different track. After the magnetic head has actually started moving, when the writing process in progress is inhibited, the above-mentioned time lag between the movement of the magnetic head and the detection of the inhibition is most likely to cause off-track writing since the inhibition correspondingly delays.

The present invention was made with the above situations as its background, and a feature of the invention is to effectively suppress non-planned movement of magnetic heads. This and other features of the present invention will be evident from the following more particular description in this specification, as illustrated in the accompanying drawings.

A data storage device according to a first aspect of the present invention includes: a medium for storing data; an access unit for accessing a storage region of the medium; a moving unit for moving the access unit to the storage region of the medium; a driving unit for driving the moving unit; and a controller for monitoring control data which defines a driving level at which the driving unit is to drive the moving unit, and controlling the driving unit so that on condition that an actual driving level of the control data monitored will be greater than a predefined driving level, the driving unit will drive the moving unit at a driving level smaller than that determined by the control data.

By monitoring control data and controlling the driving unit, it is possible to prevent without a delay the moving unit from being driven at an excessive driving level by the driving unit. The present aspect is suitable for a case where the moving unit includes a voice coil motor, and the driving unit supplies to the voice coil motor a driving current defined by the control data.

In some embodiments, the data storage device further includes a control data generator that generates the control data that will be set in the driving unit and the controller monitors the control data existing before the control data is set in the driving unit. The operation of the driving unit can be reliably detected beforehand by monitoring the control data existing before the control data is set in the driving unit. The present aspect is further suitable for a data storage device wherein servo data that includes current-position data is stored to the medium, and the control data generator generates the control data on the basis of the current-position data mentioned above.

Preferably, on condition that a driving level within the control data monitored will be greater than a predefined driving level, the controller sets predefined data in the driving unit as the control data. By setting the predefined data, it is possible to effectively prevent the moving unit from being driven at its unexpected driving level.

Preferably, on condition that a driving level of the control data monitored will be not greater than a predefined driving level, the controller sets the monitored control data in the driving unit. Efficient processing thus becomes possible. Conversely, it is preferable that on condition that a driving level of the control data monitored will be greater than a predefined driving level, the controller should inhibit data writing to the medium. The occurrence of an error during data writing can thus be prevented without a delay.

Preferably, on condition that a driving level of the control data monitored will be greater than a predefined driving level, the controller inhibits data writing to the medium and, in addition, sets predefined data in the driving unit as the control data. Thus, it is possible for the occurrence of a data-writing error to be prevented without a delay and for the moving unit to be effectively prevented from being driven at its unexpected driving level.

In specific embodiments, the predefined driving level mentioned above is previously set as a modifiable parameter. Designing commensurate with the data storage device thus becomes possible. Preferably, the control data generator and the controller are both formed of a hardware logic. Thus, control processing can be conducted rapidly.

A data storage device according to a second aspect of the present invention includes: a medium for storing data; an access unit for accessing a storage region of the medium; a moving unit for moving the access unit to the storage region of the medium; a driving unit for driving the moving unit; and a controller for monitoring control data which defines a driving level at which the driving unit is to drive the moving unit, and controlling the driving unit so that on condition that an actual driving level of the control data monitored will be outside a predefined range, data writing to the medium is inhibited. By monitoring control data, it is possible for the occurrence of a data-writing error to be prevented since data writing can be inhibited.

Preferably, on condition that a driving level within the control data monitored will be outside a predefined range, the controller sets predefined data in the driving unit as the control data. It is thus possible to effectively prevent the moving unit from being driven at its unexpected driving level.

It is preferable that servo data which includes current-position data should be stored to the medium, that the data storage device further include a control data generator for generating, on the basis of the current-position data, the control data which will be set in the driving unit, and that the controller should monitor the control data existing before the control data is set in the driving unit. By monitoring directly the control data set in the driving unit, it is possible to prevent, reliably and without a delay, the moving unit from being driven at an excessive driving level.

A third aspect of the present invention is a control method for a data storage device which includes: medium for storing data; an access unit for accessing a storage region of the medium; a moving unit for moving the access unit to the storage region of the medium; and a driving unit for driving the moving unit.

This control method includes: generating control data which defines a driving level at which the driving unit is to drive the moving unit; acquiring the control data generated; determining whether a driving level within the generated control data is outside a predefined range; and controlling the driving unit so that on condition that the driving level within the control data is outside a predefined range, the driving unit may drive the moving unit at a driving level smaller than that determined by the control data. By monitoring control data and controlling the driving unit, it is possible to prevent without a delay the moving unit from being driven at an excessive driving level by the driving unit.

It is preferable that in the above control step, on condition that a driving level within the control data is within a predefined range, the control data acquired should be set in the driving unit, or that the control method further should include inhibiting data writing to the medium on condition that a driving level within the control data is outside a predefined range. By monitoring control data, it is possible for the occurrence of a data-writing error to be prevented since data writing can be inhibited. Alternatively to the foregoing in the control step, it is preferable that on condition that a driving level within the control data is outside a predefined range, predefined data should be set in the driving unit as the control data. It is thus possible to effectively prevent the moving unit from being driven at its unexpected driving level.

A fourth aspect of the present invention is a control method for a data storage device which includes: medium for storing data; an access unit for accessing a storage region of the medium; a moving unit for moving the access unit to the storage region of the medium; and a driving unit for driving the moving unit.

This control method includes: acquiring control data which defines a driving level at which the driving unit is to drive the moving unit; determining whether a driving level within the generated control data is greater than a predefined value; and inhibiting data writing to the medium on condition that the driving level within the control data is greater than a predefined value. By monitoring control data, it is possible for the occurrence of a data-writing error to be prevented since data writing can be inhibited.

The control method further includes generating the above-mentioned control data, and in the above-mentioned acquisition step, the control data generated in the generating step is acquired before the control data is set in the driving unit. The operation of the driving unit can be detected beforehand by monitoring control data before the control data is set in the driving unit. Preferably, there is further included setting predefined data in the driving unit as the control data, on condition that a driving level within the control data monitored will be greater than a predefined driving level. It is thus possible to effectively prevent the moving unit from being driven at its unexpected driving level.

According to the present invention, unexpected movement of an access unit which accesses storage medium can be prevented more reliably.

DETAILED DESCRIPTION OF THE INVENTION

An embodiment to which the present invention can be applied is described below. The description below relates to an embodiment of the present invention, and the invention is not limited by the embodiment. For the clarity of description, the description below and the accompanying drawings cited therein are partly omitted and simplified as appropriate. Elements of the embodiment below can be modified, added, and converted easily within the scope of the present invention by a person skilled in the art. In the description of each drawing, the same element is assigned the same numeral and, for the clarity of description, overlapped description is omitted as required.

Figure 1:
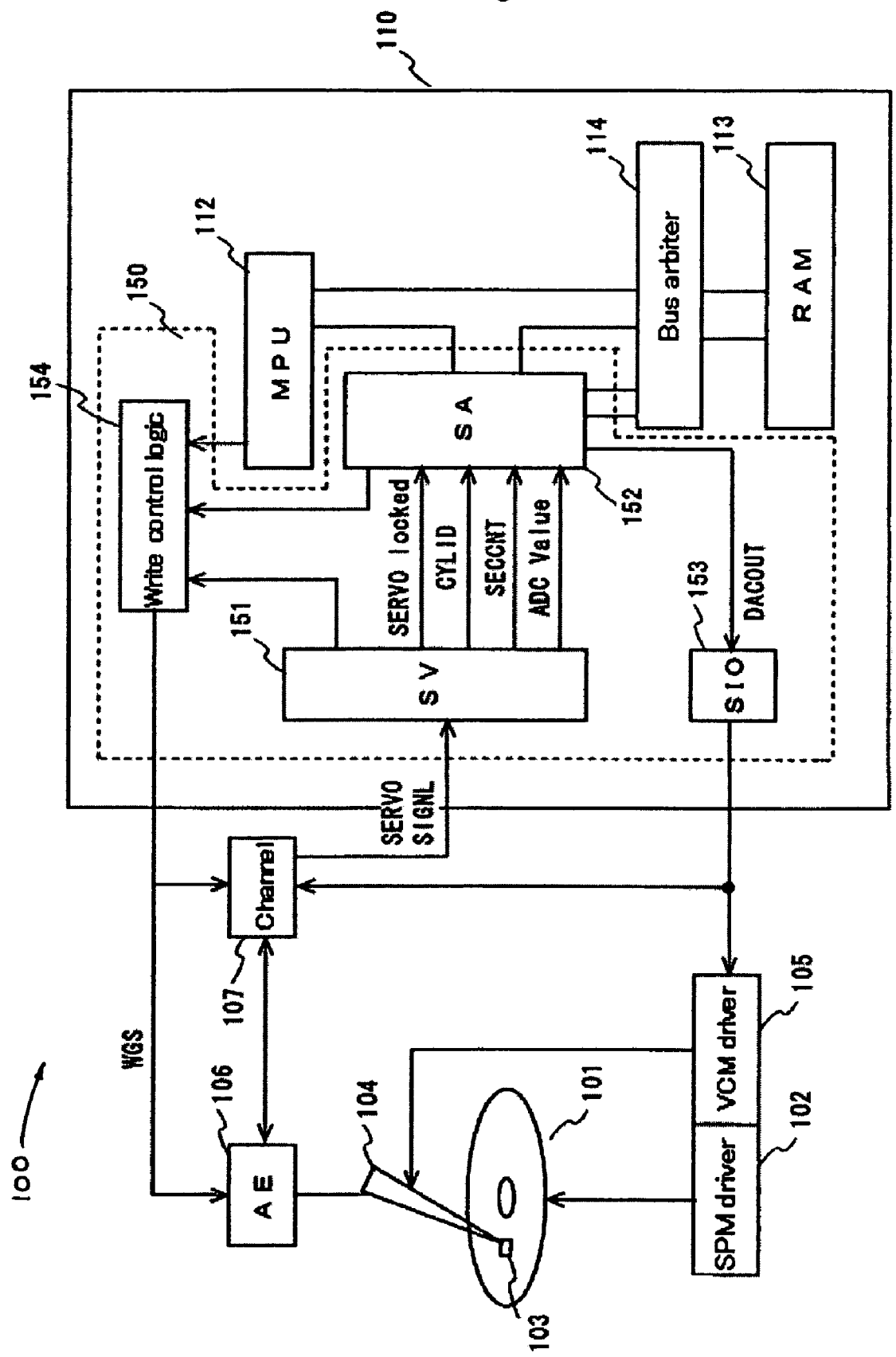
FIG. 1 is a block diagram showing an approximate configuration of the hard-disk drive (HDD) pertaining to an embodiment of the present invention.

FIG. 1 is a block diagram showing an approximate configuration of a hard-disk drive (HDD) 100 pertaining to an embodiment of the present invention. In the present embodiment, although servo control of the HDD 100 is described in detail, the description below includes an overview of general functions of each of the blocks constituting the HDD 100. The HDD 100 has one or a plurality of magnetic disks 101 as an example of media (only one magnetic disk is shown). The magnetic disk 101 is a nonvolatile recording medium having a magnetic layer magnetized to record data. The magnetic disk 101 is rotated at a required speed by a spindle motor. The spindle motor is controllably driven by an SPM driver 102 which obeys control of a controller 110.

The HDD 100 further includes a magnetic head 103 associated with a recording surface of each magnetic disk 101, the magnetic head 103 being an example of an access unit which accesses a storage region of the magnetic disk 101. The magnetic head 103 is formed as a thin-film element equipped with a write head/read head, and fixed to a surface of a slider. In the figure, a magnetic head 103 installed on the slider is shown. The slider to which the magnetic head 103 is fixed is connected to a carriage 104, and the carriage 104 is driven by a voice coil motor (VCM, 210 in FIG. 2) so as to oscillate radially on a surface of the magnetic disk 101. The carriage 104 and the VCM 210 are preferred examples of a moving unit. The VCM 210 is controllably driven by a VCM driver 105. The VCM driver 105 drives the VCM by supplying thereto a driving current corresponding to a driving level defined by the control data (DACOUT) sent from the controller 110.

Numeral 106 denotes arm electronics (AE) disposed adjacently to the magnetic head 103 in order to supply recording signals thereto and pick up (amplify) read outputs of the magnetic head 103. Numeral 107 denotes a channel, which performs user data read/write processes. During the write process, the channel 107 converts into code form the write data supplied from the controller 110, then further reconverts coded write data into write signals (currents) to the AE 106, and supplies the write signals (currents). During the read process, the channel 107 extracts data from the read signals supplied from the AE 106, and decodes the data. Decoded read data is then supplied to the controller 110.

In addition, the channel 107 extracts servo signals from the read outputs supplied from the AE 106 in order to provide servo control. The servo signals contain burst patterns, cylinder IDs (CYLIDs), and sector numbers. The servo signals and servo control are described in detail later.

The controller 110 provides servo control and performs processes, such as data write/read control and necessary data processing, on the magnetic disk 101. In the present embodiment, the controller 110 is formed as one semiconductor circuit chip. The controller includes a hard-disk controller (HDC) 150, an MPU 112, a RAM 113, and a bus arbiter 114. Although not explicitly shown in the figure, the processes performed by the HDC 150 include establishing an interface to a host, exchanging control signals such as user data and commands, and processing data for error code correction (ECC). In addition, the HDC 150 provides data processing for servo control. Internal blocks of the HDC 150 and its servo control are detailed later.

The MPU 112 operates in accordance with the microcodes loaded within the RAM 113, and performs processes that include controlling the interface to the host, managing defects, and controlling other factors on the entire HDD 100, or providing necessary processing for data processing. The microcodes executed on the MPU 112 can be stored into a ROM (not shown in the figure) or onto the magnetic disk 101 beforehand. In addition to storing microcodes, control data, and write/read data, the RAM 113 is used as a working region for calculation. The bus arbiter 114 executes bus arbitration and adjusts giving bus usage control to the MPU 112 or the HDC 111, for example, when both simultaneously request the use of a bus.

Figure 2:
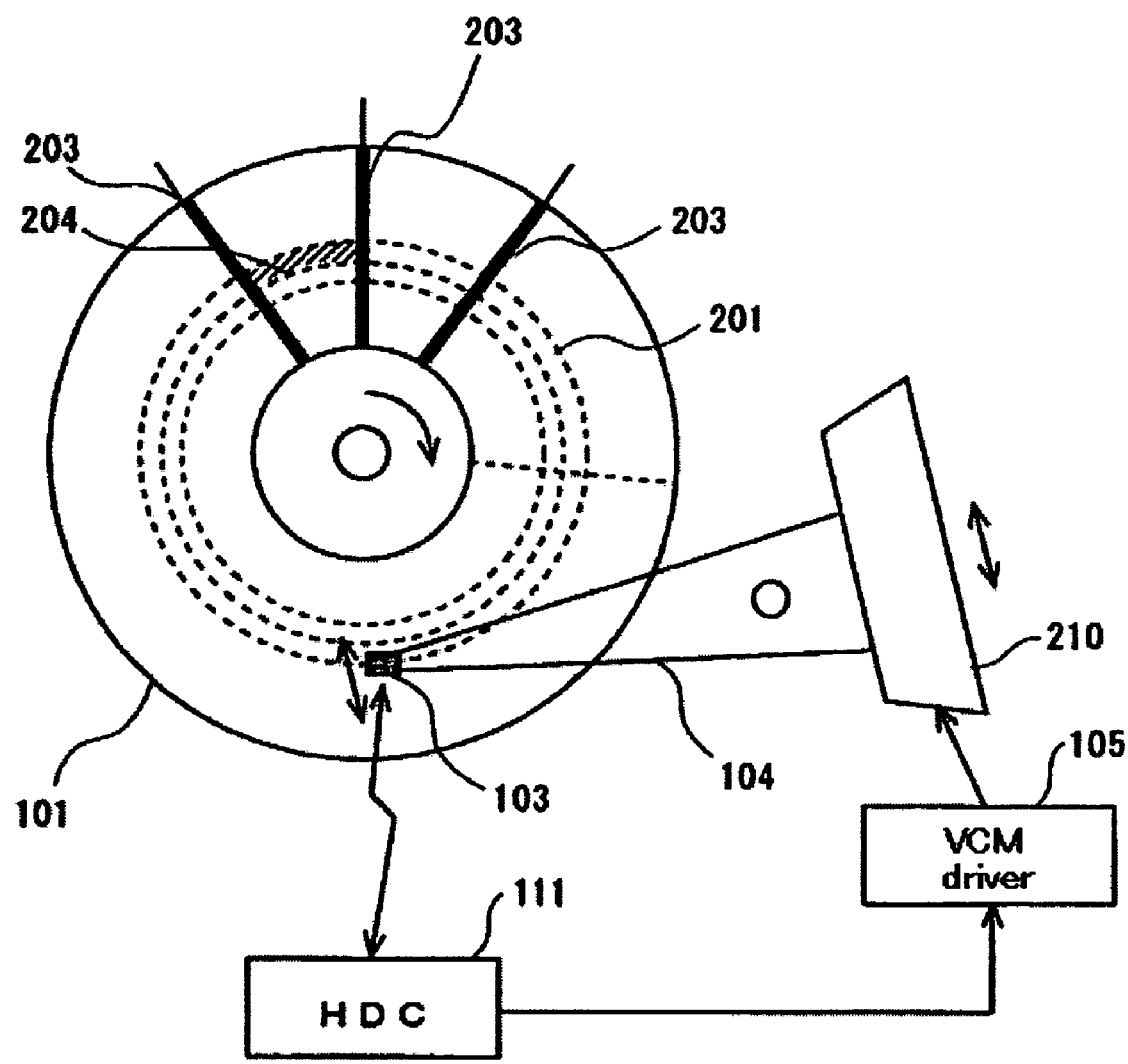
FIG. 2 is a diagram showing the data structure stored within the magnetic disk pertaining to an embodiment of the present invention.

In order to describe the servo control applied in the present embodiment, a data structure stored within the magnetic disk 101 is described using FIG. 2. On a surface of the magnetic disk 101, a plurality of concentric tracks 201 are formed as partitions for storage of data. On the surface of the magnetic disk 101, a servo pattern storage region 203 is formed and typically, the magnetic disk 101 is formed in a radial direction and includes a plurality of servo pattern storage regions 203 arranged at each of required angles in a circumferential direction. A user data storage region 204 is formed between every two servo pattern storage regions 203. In the user data storage region 204, tracks are each divided into sectors as recording units of user data. The data region may be separated into several zones in a radial direction, and for each zone, the number of sectors that corresponds to positions in the radial direction may be recorded to ensure uniform recording density.

Information on a position of the magnetic head 103 can be acquired by reading a servo pattern by use of the magnetic head 103. The servo pattern includes position data that indicates a current position of the magnetic head 103. More specifically, cylinder IDs (CYLIDs) that indicate track numbers, physical servo sector numbers (SECCNTs) that indicate the order of servo data, burst patterns (WEDGE-A, WEDGE-B, WEDGE-C, and WEDGE-D) for tracking (following) control, and other data are encoded using an encoding scheme suitable for respective data write/read, and then recorded appropriately.

The CYLIDs are recorded in special notation called "gray codes". This notation, unlike normal binary notation, is defined so that each time a value increases by 1, only a single location in a bit pattern changes. In this notation, even if the magnetic head skips between a cylinder "n" and (n−1), either of respective values is reliably obtained. The SECCNTs are numbers for identifying individual servo patterns, and even if the positions in the radial direction differ, the above numbers do not change and are therefore recorded in a binary format. The channel 107 extracts the CYLIDs and the SECCNTs and supplies both as SERVO SIGNALs to the controller 110.

The burst patterns (WEDGE-A, WEDGE-B, WEDGE-C, and WEDGE-D) detect detailed positions on tracks, eliminate uncertainty from the above-described CYLIDs, and are recorded to clearly define where on adjacent tracks the magnetic head is positioned. Each burst pattern consists of subsidiary burst patterns each having a track pitch of width with two tracks as one period, and recording positions in a radial direction are each disposed and recorded so as to differ by half of the track pitch.

When the magnetic head 103 moves along surfaces of the tracks having the construction described above, CYLID, SECCNT, WEDGE-A, WEDGE-B, WEDGE-C, and WEDGE-D outputs appear in that order across an output of the magnetic head 103. Read levels of these burst patterns WEDGE-A, WEDGE-B, WEDGE-C, and WEDGE-D change according to a particular position of the magnetic head 103. The channel 107 extracts and reads burst patterns in addition to CYLIDs and SECCNTs, and then supplies each as a SERVO SIGNAL to the controller 110.

The controller 110 generates control data of the VCM driver 105 from the SERVO SIGNALs acquired from the channel 107, and sets the control data in the VCM driver 105. The VCM driver 105 moves the magnetic head 103 to a desired track and sector by controlling a VCM-driving current according to the control data. More specifically, the controller 110, when instructed from an external host to read or write a logic block address (LBA) specified therefrom, calculates a target track, a target sector, etc. from the specified LBA.

After the target track has been calculated, the controller 110 controls the magnetic head 103 so as to accelerate it towards the target track. Next, when a moving speed of the magnetic head 103 reaches a required speed, the magnetic head 103 is then controlled to move at a fixed speed (speed control mode). After reaching a vicinity of the target track, the magnetic head 103 is further controlled to decelerate (settling mode). After reaching the target track, the magnetic head 103 undergoes following control to follow up the target track (track-following mode). During data reading from or data writing onto the magnetic disk 101, the magnetic head 103 is position-controlled in the track-following mode.

A servo control process performed during the above-described moving process for the magnetic head 103, especially, a servo control process in the servo controller 110 or in the HDC 150 is described below. The HDD 100 in the present embodiment prevents supply of an overcurrent to the VCM by monitoring the control data that controls the driving current value supplied from the VCM driver 105. Alternatively, the HDD 100 prevents off-track writing, which is a process of writing data at non-planned positions, by inhibiting a data-writing process according to particular monitoring results on the control data.

Referring to FIG. 1, the channel 107 outputs to the HDC 150 the SERVO SIGNAL extracted and read from output signals of the AE 106. As mentioned earlier, the SERVO SIGNAL contains information relating to CYLIDs, SECCNTs, and burst patterns. The controller 110 generates, from the SERVO SIGNAL acquired from the channel 107, a servo output "DACOUT" defining a driving current value to be supplied to the VCM 210, and outputs the DACOUT to the VCM driver 105. In order to allow the magnetic head 103 to access a desired address, the VCM driver 105 controls the supply current to the VCM according to the acquired DACOUT, thus moving the magnetic head 103 to a desired track and sector.

As shown in FIG. 1, the HDC 150 has a servo controller (SV) 151, a hardware sequencer (SA: Servo Control Assist) 152 having a digital filter structure for controlling different hardware by use of one circuit, a serial I/O (SIO) block 153 for converting parallel data into serial data, or vice versa, and a write control logic 154.

The SV 151 generates a CYLID and an SECCNT on the basis of the SERVO SIGNAL received from the channel 107, generates from burst patterns the burst data (ADC Values A, B, C, D) indicating a reproduction level of each burst pattern, and stores the above four types of data into a register. The SV 151 then outputs these four types of data and control data "SERVO locked" to the SA 152.

In response to a request from the SV 151 on the basis of "SERVO locked", the SA 152 computes and generates the servo output (DACOUT) supplied to the VCM driver 105. The DACOUT defines a current value to be supplied from the VCM driver 105 to the VCM. The SA 152 executes required arithmetic processing and generates the DACOUT, by using the CYLID, SECCNT, and ADC Values acquired from the SV 151. In addition, in the present embodiment, the SA 152 monitors the DACOUT generated and thus prevents an overcurrent from being supplied to the VCM. The SA 152 also inhibits data writing, thus preventing off-track writing. Internal processing by the SA 152 is described in further detail later.

In the SIO block 153, a servo output (DACOUT, parallel) from the SA 152 is converted into serial data for supplying the above servo output to a digital/analog converter (DAC) present inside the VCM driver 105. The write control logic 154 controls a data-writing process according to particular control signals from other blocks. In particular, the write control logic 154 outputs to the AE 106 and other blocks a write gate signal (WGS) which controls operation timing of lights. Data writing can be inhibited by masking the WGS.

Figure 3:
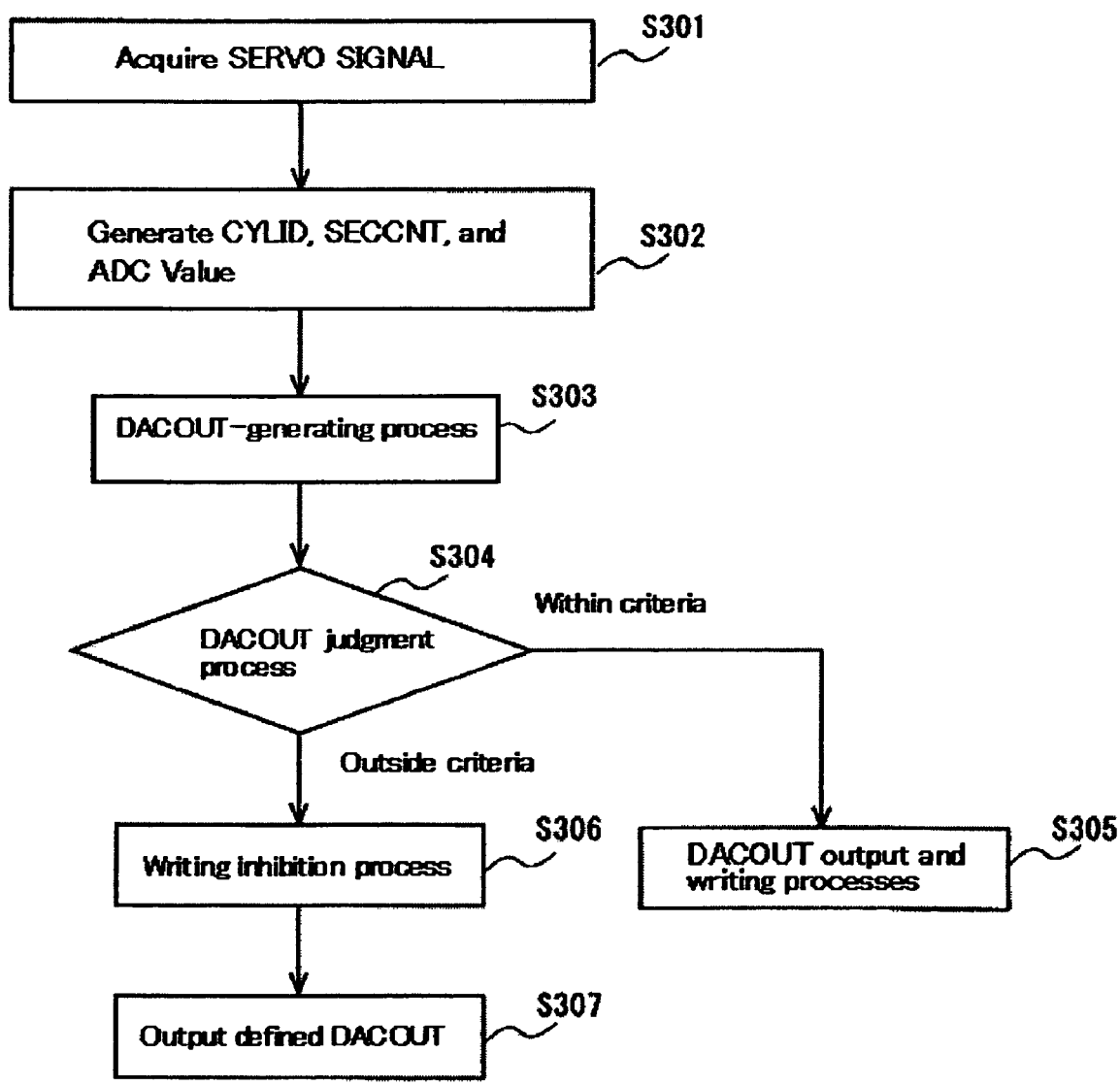
FIG. 3 is a flowchart explaining total processing of servo control (magnetic head position control) in the above embodiment.

Total servo control (magnetic head position control) in the present embodiment is described below using a flowchart of FIG. 3. In step S301, the SV 151 acquires a SERVO SIGNAL from the channel 107. In step S302, the SV 151 further generates a CYLID, an SECCNT, and ADC Values, from the SERVO SIGNAL acquired. The SV 151 then outputs "SERVO locked" to the SA 152 in order to request the SA 152 to start generating a DACOUT, and further outputs the CYLID, the SECCNT, and the ADC Values, to the SA 152.

In step S303, the SA 152 acquires the CYLID, the SECCNT, and the ADC Values, from the SV 151 and performs arithmetic and DACOUT-generating processes in accordance with the request from the SV 151. In step S304, the SA 152 monitors the DACOUT generated, compares a value of the DACOUT with a predefined reference value, and conducts a judgment process on the DACOUT value. In the judgment process, the SA 152 determines whether the DACOUT is within a predefined range.

Data writing and the VCM are controlled according to the DACOUT judgment results obtained from the SA 152. When the DACOUT is within the predefined range, normal data writing is conducted. The SA 152 then outputs the generated DACOUT to the SIO block 153. The SA 152 also outputs a writing permission signal of the write control logic 154. The SIO block 153 conducts a parallel-to-serial conversion of the DACOUT acquired, and outputs conversion results to the VCM driver 105. At the thus-determined magnetic head position, data is written onto the magnetic disk 101. (Step S305)

If the DACOUT is outside the predefined range (for example, not greater than a required value), data writing is inhibited in step S306. The SA 152 then outputs to the write control logic 154 a writing inhibition signal for inhibiting data writing. The write control logic 154, after acquiring a writing inhibition signal from either the MPU 112, the SV 151, or the SA 152, performs a data-writing inhibition process. After acquiring the writing inhibition signal, the write control logic 154 masks the WGS (write gate signal), thus specifying the inhibition of data writing onto the magnetic disk 101. In response to the WGS, the AE 106 stops data writing onto the magnetic disk 101. Data writing at non-planned positions can thus be prevented.

Furthermore, if the DACOUT is outside criteria, the SA 152 acquires a prestored defined DACOUT and outputs this DACOUT to the SIO block 153 in step S307. The SIO block 153 conducts a parallel-to-serial conversion of the defined DACOUT acquired, and sets this defined DACOUT as serial data in a register of the VCM driver 105. Unexpected significant movement of the magnetic head can be prevented by transmitting the defined DACOUT.

Figure 4:
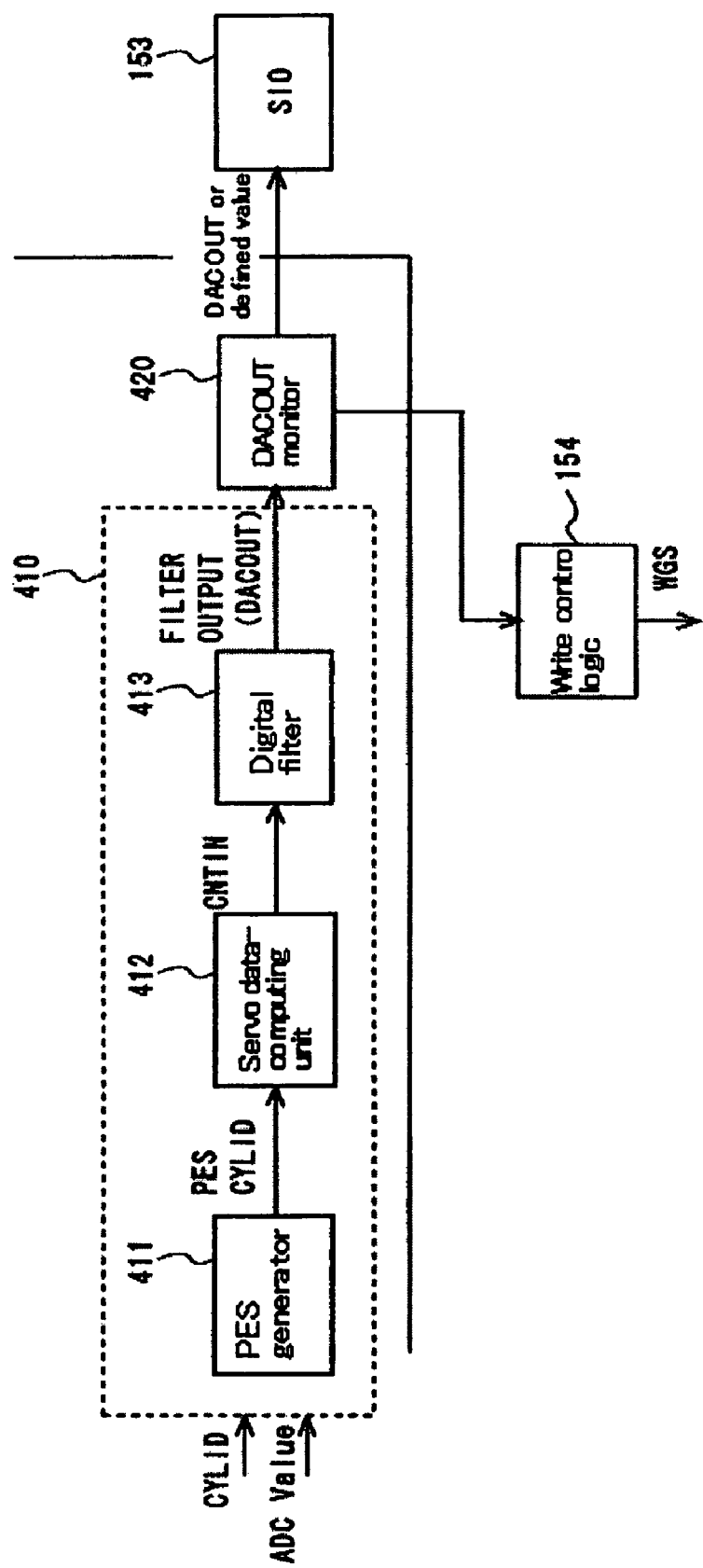
FIG. 4 is a block diagram showing a logical configuration relating to servo control in the servo control assistant (SA) of the above embodiment.

FIG. 4 is a block diagram showing a logical configuration relating to servo control by the SA 152 in the present embodiment. The SA 152 includes a DACOUT generator 410 that is an example of a control data generator for generating servo outputs to the VCM driver 105, and a DACOUT monitor 420 that controls data writing. The DACOUT generator 410 includes a position error signal (PES) generator 411, a servo data-computing unit 412, and a digital filter 413.

The SA 152 is a hardware logic assisting the disk drive to control its magnetic head position, and has a digital filter structure built in a hardware logic block for controlling different types of hardware, ranging from a very compact HDD of one inch in size to a large-size HDD, with one circuit. Since the SA 152 operates in a previously set hardware sequence, the SA can operate rapidly and is also independently operable from the MPU 112 or the like.

The DACOUT generator 410, for example, can be constituted of a plurality of registers, a selector for selecting data and providing simple data-processing such as reversal and shifting, a data adder, an SIO timer for controlling operation timing of output to the SIO block 153, and a hardware-state machine for controlling the entire SA 152. The fact that the hardware-state machine controls arithmetic operations on the basis of instructions from the MPU 112 activates the above hardware configuration to function as each block mentioned above, whereby it is possible to conduct complex computations such as filter processing and computations for servo control.

Similarly, the DACOUT monitor 420 is formed as a hardware logic in the SA 152. As described above, the controller 110 in the present embodiment generates a servo output (DACOUT) to the VCM driver 105 without direct intervention by the MPU 112. Accordingly, by monitoring the servo output and building into the controller 110 a hardware logic which controls data writing, it is possible to control the VCM rapidly and efficiently and to prevent off-track writing. Alternatively, the SA 152 is mounted as part of the HDC 150, and as described above, the HDC 150 is provided on the same element as that of the MPU 112. This arrangement of the SA 152 and the HDC 150 allows contribution to reductions in package size, drive dimensions, and the like.

FIG. 4 shows a logical configuration for the SA 152 to perform part of its function. Each element in this configuration is described below using FIG. 4. The PES generator 411 generates position error information PES from the CYLID and ADC Values A, B, C, D acquired from the SV 151. An in-track position error signal PES can be generated using the A, B, C, and D that are data indicating reproduction output levels of burst patterns. The PES, for example, is constituted of an MPES and SPES determined in accordance with the following equations:

$$MPES=(A-B)/(A+B) \times H + 80h = 2A/(A+B) \times H + 80h - H$$

$$SPES=(C-D)/(C+D) \times H + 80h = 2C/(C+D) \times H + 80h - H$$

The servo data-computing unit 412 acquires a position error signal (PES) and a CYLID from the PES generator 411, and uses the PES and the CYLID to calculate servo data (CNTIN) for controlling the VCM driver 105. During a CNTIN generating process, the servo data-computing unit 412 performs appropriate coefficient-computing and other arithmetic operations in the servo control mode mentioned above. The servo control mode can be determined using the PES and the CYLID.

More specifically, during the CNTIN generating process, in accordance with required calculation equations, current in-track position information CUR POS, current track information CUR CYL, and CUR TRK information composed of the foregoing two types of information are determined from the above-mentioned MPES, SPES, and CYLID. Those three types of information and target track information TAR TRACK are then further used to generate several parameters concerning the position and speed of the magnetic head. The servo data CNTIN can be calculated as a sum between the parameters generated and the data obtained by multiplying by a suitable coefficient the data calculations obtained up to reproduction of the previous servo data.

The parameters used to generate CNTIN are, for example, deviation CPE, deviation sum SPE, and speed CVE. Computation of the servo data CNTIN is not described in detail since, as disclosed in U.S. Pat. No. 6,377,418 and other documents, the computation is well-known technology. Briefly described, the deviation CPE is a difference between the lower-order bits and in-track position in the CUR TRK–TAR TRACK distance. The deviation sum SPE is a sum of the deviation CPE data obtained when a plurality of servo patterns are reproduced, and the speed CVE is a difference in deviation between the servo patterns.

The digital filter 413 performs a filtering process on servo data CNTIN and calculates DACOUT data for providing a feedback to the VCM driver 105. A problem may occur when the VCM is driven without any band limitations being imposed on the servo data CNTIN calculated as described above. For example, an actuator system formed of the carriage 104 and other elements contains mechanical resonance frequency components. If the servo data (CNTIN) is supplied intact as DACOUT to the VCM driver 105, the resonance frequency components in the data may cause the actuator system to resonate. A notch filter is therefore used to reduce the resonance frequency components. In addition, an appropriate filtering process is selected according to the particular servo control mode. Filter characteristics are selected by modifying the coefficients used in the arithmetic operations of the SA 152. These coefficients are set by the MPU 112.

By conducting an over-sampling process in which the control data (DACOUT) for each servo pattern is output during a split number of operations, any sounds generated by vibration of the carriage 104 can be moved out from a human-audible frequency band. In the SA 152, processing up to calculation of the servo data DACOUT is executed once for each servo pattern and then a filtering process is performed to output first DACOUT. After this, a filtering process for second DACOUT is immediately performed, and the SA 152 stands by until a DACOUT request is issued in accordance with a timer which measures DACOUT intervals.

When a timer-based DACOUT request is received, previously calculated DACOUT is output and similar processing is repeated a specified number of times, whereby DACOUT can be output at, for example, ¼ of the servo pattern intervals. By conducting such an over-sampling process, audible-band sound levels can be reduced, even if such low-pass filter (LPF) as mentioned above is not necessarily used during a seek operation.

The DACOUT monitor 420 acquires FILTER OUTPUT as a filter output value from the digital filter 413 and monitors the value. As mentioned above, the FILTER OUTPUT is equivalent to the DACOUT generated by the DACOUT generator 410. The DACOUT monitor 420 stores CRITERIA as predefined reference data. The reference data, CRITERIA, can be prestored within, for example, the magnetic disk 101 or a ROM.

It is preferable that the reference data, CRITERIA, be modifiable. This allows appropriate data to be set by designing the HDD according to particular specifications thereof so as to prevent a hardware error from occurring. From the viewpoint of the ease in modification, it is also preferable that the reference data, CRITERIA, be programmably set as data in a register (memory). In addition, the reference data, CRITERIA, can be modified in a servo control mode and appropriate data can thus be set. For example, since the magnetic head 103 significantly vibrates immediately after settling, off-track writing can be prevented by tightening (reducing) the reference data, CRITERIA, during a predefined time period which immediately follows settling.

Figure 5:
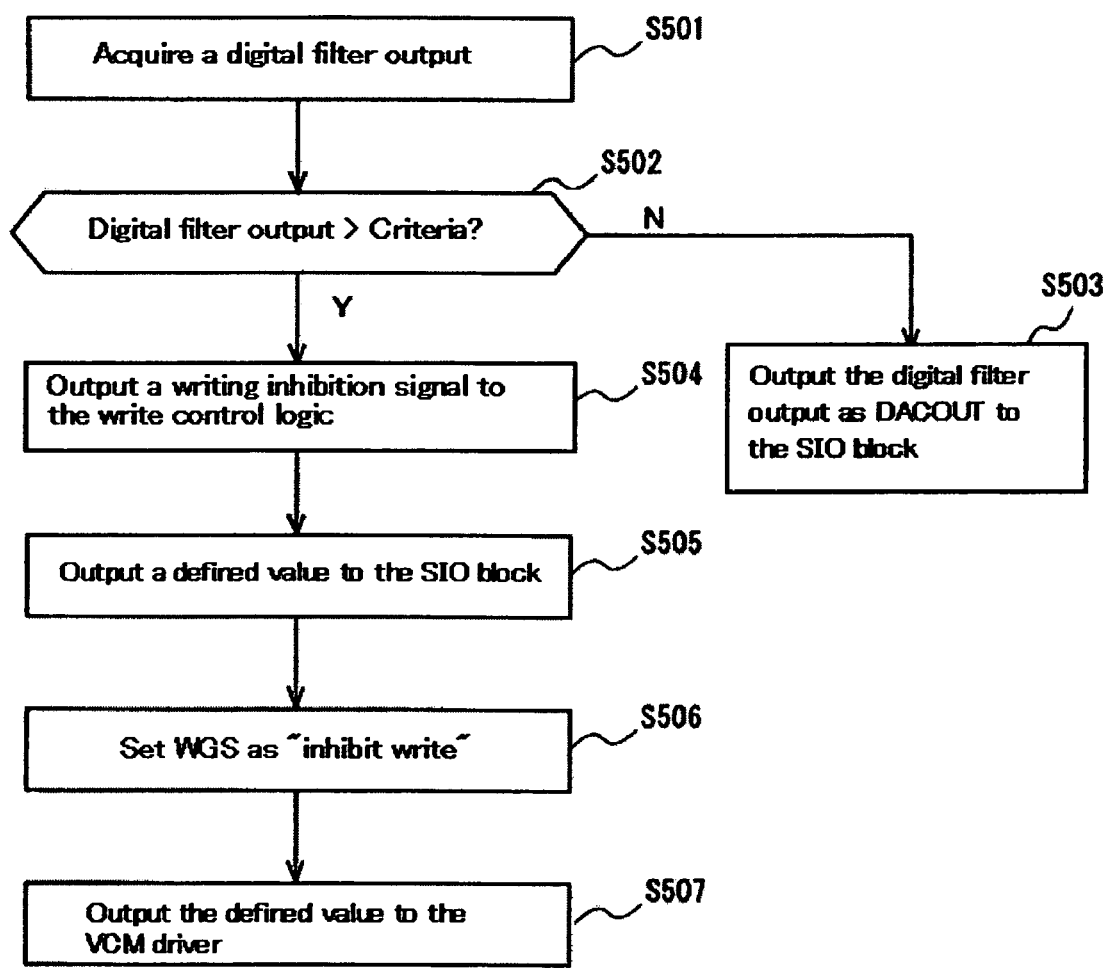
FIG. 5 is a flowchart explaining details of processing in the DACOUT monitor.

The DACOUT monitor 420 determines the occurrence of an error on the basis of the FILTER OUTPUT and CRITERIA acquired. The DACOUT monitor 420 can control writing processes according to a particular relationship in magnitude between the acquired FILTER OUTPUT and CRITERIA. More specific processing by the DACOUT monitor 420 is described below using FIG. 5. The DACOUT monitor 420, after acquiring FILTER OUTPUT in step S501, compares its absolute value and CRITERIA in step S502. If the absolute value of the FILTER OUTPUT is not greater than the CRITERIA (i.e., within a required range), an error is judged not to be occurring and the acquired FILTER OUTPUT is output as DACOUT to the SIO block 153 in step S503.

If the absolute value of the FILTER OUTPUT is greater than the CRITERIA (i.e., outside the required range), the DACOUT monitor 420 judges an error to be occurring and determines the inhibition of data writing onto the magnetic disk 101. The DACOUT monitor 420 then outputs a writing inhibition signal as a writing inhibition request to the write control logic 154 in step S504. In order to prevent an overcurrent from being supplied to the VCM 210, the DACOUT monitor 420 further outputs predefined DACOUT to the SIO block 153 in step S505. In step S506, the write control logic 154 masks a WGS to request the inhibition of writing ("inhibit write"), and the SIO block 153 outputs to the VCM driver 105 the redefined DACOUT acquired above.

As described above, according to the present embodiment, by monitoring DACOUT which is control data defining an electric current value of the VCM driver 105, an overcurrent can be prevented from being supplied therefrom to the VCM. In particular, compared with the previous method for detecting runaway of the carriage from the magnetic head position, the control method employed in the present embodiment makes it possible for supply of an overcurrent to be prevented without a delay and thus for runaway of the carriage to be prevented effectively. Supply of an overcurrent to the VCM can be effectively prevented by monitoring the electric current control data finally set in the VCM driver which directly drives the VCM.

Alternatively, since data writing is inhibited in response to the DACOUT monitored, off-track writing can be prevented effectively. In particular, by monitoring DACOUT in a track-following mode following completion of a target-track seek operation, non-planned movement of the magnetic head can be detected without a delay beforehand, which, in turn, allows off-track writing to be prevented more reliably.

Although the preferred embodiment of the present invention has been described above, the above description can be changed within the scope of the invention. Configurations different from those described above can be implemented for each type of processing described. For example, it is possible for part of processing by the SA 152 to be executed using the SV 151 or for part of the function of the SV 151 to be undertaken by the channel 107. It is also possible to use software to constitute hardware elements or to use hardware to constitute software elements.

Preferably, in terms of servo control, a writing inhibition process and current control of the VCM are both performed. However, only one of them can also be performed according to particular control requirements. For example, driving-current control of the VCM can also be conducted during reading. Although it is preferable that the data monitored should be DACOUT set in the VCM driver in order to define the supply current thereto, it is likewise possible to use other data or signals for computing DACOUT or, depending on particular design conditions, to use the data and signals generated from DACOUT.

The DACOUT defining the supply current to the VCM driver can be generated not only by above-described processing, but also by using other widely known arithmetic processing. In addition, servo control in the present invention can be applied not only to an HDD equipped with a magnetic storage medium, but also to other forms of data storage devices such as a data storage device for storing data optically.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A data storage device comprising:
   a medium for storing data;
   an access unit configured to access a storage region of said medium;
   a moving unit configured to move said access unit to the storage region of said medium;
   a driving unit configured to drive said moving unit; and
   a controller configured to monitor control data which defines a driving level at which said driving unit is to drive said moving unit, and control said driving unit so that on condition that a driving level within the control data monitored will be greater than a predefined driving level, said driving unit may drive said moving unit at a driving level smaller than that determined by the control data.

2. The data storage device according to claim 1, wherein:
   said moving unit includes a voice coil motor; and
   said driving unit supplies to said voice coil motor a driving current defined by the control data.

3. The data storage device according to claim 1, further comprising a control data generator configured to generate the control data which will be set in said driving unit;
   wherein said controller monitors the control data existing before it is set in said driving unit.

4. The data storage device according to claim 3, wherein said control data generator and said controller are both formed of a hardware logic.

5. The data storage device according to claim 3, wherein:
   said medium stores servo data which includes current-position data; and
   said control data generator generates the control data on the basis of the current-position data.

6. The data storage device according to claim 1, wherein, on condition that a driving level of the control data monitored will be greater than a predefined driving level, said controller sets predefined data in said driving unit as the control data.

7. The data storage device according to claim 1, wherein, on condition that a driving level of the control data monitored will be not greater than a predefined driving level, said controller sets the monitored control data in said driving unit.

8. The data storage device according to claim 1, wherein, on condition that a driving level of the control data monitored will be greater than a predefined driving level, said controller inhibits data writing to said medium.

9. The data storage device according to claim 1, wherein, on condition that a driving level of the control data monitored will be greater than a predefined driving level, said controller inhibits data writing into/onto said medium and, in addition, sets predefined data in said driving unit as the control data.

10. The data storage device according to claim 1, wherein the predefined driving level is previously set as a modifiable parameter.

11. A control method for a data storage device which comprises a medium for storing data, an access unit configured to access a storage region of said medium, a moving unit configured to move said access unit to the storage region of said medium, and a driving configured to drive said moving unit, said control method comprising:
    generating control data which defines a driving level at which said driving unit is to drive said moving unit;
    acquiring the control data generated;
    determining whether a driving level within the control data is outside a predefined range; and
    controlling said driving unit so that on condition that the driving level within the control data is outside a predefined range, said driving unit may drive said moving unit at a driving level smaller than that determined by the control data.

12. The method of controlling a data storage device according to claim 11, wherein:
    in controlling said driving unit, on condition that a driving level within the control data is within a predefined range, the control data acquired will be set in said driving unit.

13. The method of controlling a data storage device according to claim 11, further comprising inhibiting data writing to said medium on condition that a driving level within the control data is outside a predefined range.

14. The method of controlling a data storage device according to claim 11, wherein:
    in controlling said driving unit, on condition that a driving level within the control data is outside a predefined range, predefined data is set in said driving unit as the control data.

* * * * *